(12) United States Patent
Ghenciu et al.

(10) Patent No.: US 11,493,526 B2
(45) Date of Patent: *Nov. 8, 2022

(54) COATED SUBSTRATE FOR BIOLOGICAL REACTION SYSTEMS

(71) Applicant: LIFE TECHNOLOGIES CORPORATION, Carlsbad, CA (US)

(72) Inventors: Eliodor Ghenciu, Atherton, CA (US); Theodore E. Straub, Lexington, MA (US); Evan W. Foster, San Mateo, CA (US); Michael C. Pallas, San Bruno, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/852,830

(22) Filed: Apr. 20, 2020

(65) Prior Publication Data

US 2020/0319221 A1 Oct. 8, 2020

Related U.S. Application Data

(62) Division of application No. 14/385,740, filed as application No. PCT/US2013/032242 on Mar. 15, 2013, now Pat. No. 10,627,421.

(Continued)

(51) Int. Cl.
*G01N 35/10* (2006.01)
*C40B 60/14* (2006.01)
(Continued)

(52) U.S. Cl.
CPC ...... *G01N 35/1002* (2013.01); *B01J 19/0046* (2013.01); *B01L 3/5088* (2013.01);
(Continued)

(58) Field of Classification Search
None
See application file for complete search history.

(56) References Cited

U.S. PATENT DOCUMENTS 5,916,526 A 6/1999 Robbins
6,027,873 A 2/2000 Schellenberger et al.
(Continued)

FOREIGN PATENT DOCUMENTS

DE 19740806 A1 4/1999

OTHER PUBLICATIONS

Erbil H.Y., et al., "Determination of the Receding Contact Angle of Sessile Drops on Polymer Surfaces by Evaporation", Langmuir, vol. 15, No. 21, Oct. 1, 1999 (Oct. 1, 1999), pp. 7378-7385, XP055507961, US, ISSN: 0743-7463, DOI: 10.1021/la9900831.
(Continued)

*Primary Examiner* — Matthew D Krcha (57) ABSTRACT

An apparatus for biological reactions is provided. The apparatus includes a substrate and a plurality of reaction sites within the substrate. A surface of the substrate is configured to have a first hydrophilicity and each surface of the plurality of reaction sites is configured to have a second hydrophilicity to load a substantial number of reaction sites with a sample volume. The sample volume of each loaded reaction site is substantially confined to its respective reaction site. The sample volume is configured to undergo a biological reaction within the reaction site.

14 Claims, 9 Drawing Sheets

Related U.S. Application Data (60) Provisional application No. 61/723,738, filed on Nov. 7, 2012, provisional application No. 61/723,759, filed on Nov. 7, 2012, provisional application No. 61/723,658, filed on Nov. 7, 2012, provisional application No. 61/612,008, filed on Mar. 16, 2012, provisional application No. 61/612,087, filed on Mar. 16, 2012, provisional application No. 61/612,005, filed on Mar. 16, 2012.

(51) Int. Cl.
*B01L 3/00* (2006.01)
*B01J 19/00* (2006.01)

(52) U.S. Cl.
CPC ....... *C40B 60/14* (2013.01); *B01J 2219/0038* (2013.01); *B01J 2219/00286* (2013.01); *B01J 2219/00317* (2013.01); *B01J 2219/00351* (2013.01); *B01J 2219/00599* (2013.01); *B01J 2219/00619* (2013.01); *B01J 2219/00637* (2013.01); *B01L 2200/0642* (2013.01); *B01L 2200/12* (2013.01); *B01L 2300/0893* (2013.01); *B01L 2300/0896* (2013.01); *B01L 2300/161* (2013.01); *B01L 2300/165* (2013.01); *B01L 2400/0406* (2013.01)

(56) References Cited

U.S. PATENT DOCUMENTS

| | | |
|---|---|---|
| 2001/0055765 A1 | 12/2001 | O'Keefe et al. |
| 2004/0037748 A1 | 2/2004 | Hasan et al. |
| 2005/0244305 A1* | 11/2005 | Fujita ................ G01N 21/09 422/400 |
| 2005/0266149 A1 | 12/2005 | Henderson et al. |
| 2006/0061754 A1 | 3/2006 | Turner et al. |
| 2006/0094108 A1 | 5/2006 | Yoder et al. |
| 2006/0105453 A1* | 5/2006 | Brenan ............ B01J 19/0046 435/325 |
| 2006/0263799 A1 | 11/2006 | Dertinger et al. |
| 2007/0003448 A1 | 1/2007 | Kanigan et al. |
| 2010/0285573 A1* | 11/2010 | Leck ................ G01N 1/31 435/288.4 |

OTHER PUBLICATIONS

Houmard M., et al., "Enhanced Persistence of Natural Super-Hydrophilicity in Tio2-Sio2 Composite Thin Films Deposited via a Sol-Gel Route", Surface Science, vol. 62, Issue. 21, Nov. 1, 2008, pp. 3364-3374.

International Preliminary Report on Patentability for Application No. PCT/US2013/032242 dated Sep. 25, 2014.

International Search Report with Written Opinion for International Application No. PCT/US2013/032242 dated Aug. 7, 2013.

Joud J.C., et al., "Surface Charges of Oxides and Wettability: Application to TiO2-SiO2 Composite Films", Applied Surface Science, vol. 287, Issue. Dec. 15, 2013, pp. 37-45.

N. K. Eib, K. L. Mittal, A. Friedrichs, Journal of Applied Polymer Science, vol. 25 2435-2438 (1980).

Zhang F., et al., "Surface and Interface Characterization of Sequentially Plasma Activated Silicon, Silicon dioxide and Germanium Wafers for Low Temperature Bonding Applications", ECS Transactions, 33 (4), 2010, pp. 329-338.

* cited by examiner

COATED SUBSTRATE FOR BIOLOGICAL REACTION SYSTEMS

CROSS-REFERENCE TO RELATED APPLICATIONS

This application is a divisional of U.S. patent application Ser. No. 14/385,740, filed Sep. 16, 2014, which is a 371 application of PCT/US2013/032242, filed Mar. 15, 2013, which claims the benefit of priority of U.S. Provisional Patent Application No. 61/612,005, filed on Mar. 16, 2012, U.S. Provisional Patent Application No. 61/612,087, filed on Mar. 16, 2012, U.S. Provisional Patent Application No. 61/723,759, filed on Nov. 7, 2012, U.S. Provisional Patent Application No. 61/612,008, filed Mar. 16, 2012, U.S. Provisional Patent Application No. 61/723,658, filed Nov. 7, 2012, and U.S. Provisional Patent Application No. 61/723,738, filed on Nov. 7, 2012, all of which are incorporated herein in their entirety by reference.

BACKGROUND

The present disclosure relates to a method of treating a surface of a substrate used in a biological reaction system, and more particularly, to a method of chemically treating a surface of a substrate used in a biological reaction system to prevent biological molecules from adhering to the surface.

Polymerase Chain Reaction (PCR) is a method of amplifying a target DNA sequence. Previously, PCR has been generally performed in 96- or 384-well microplates. If higher throughputs are desired, conventional PCR methods in microplates are not cost effective or efficient. Further, in increasing throughput, reducing the PCR reaction volumes may lower the consumption of reagents, leading to a decrease in amplification times from the reduced thermal mass of the reaction volumes. This strategy may be implemented in an array format (m×n), resulting in a large number of smaller reaction volumes. Furthermore, using an array allows for a scalable high throughput analysis with increased quantification sensitivity, dynamic range, and specificity.

Arrays have also been used to perform Digital Polymerase Chain Reaction (dPCR). Results from dPCR can be used to detect and quantify the concentration of rare alleles, to provide absolute quantitation of nucleic acid samples, and to measure low fold-changes in nucleic acid concentration. Generally, increasing the number of replicates increases the accuracy and reproducibility of dPCR results.

The array format in most quantitative polymerase chain reaction (qPCR) platforms is designed for sample-by-assay experiments, in which PCR results need to be addressable for post-run analysis. For dPCR, however, the specific position or well of each PCR result may be immaterial and only the number of positive and negative replicates per sample may be analyzed.

The read-out of dPCR, that is, the number of positive reactions and the number of negative reactions, is linearly proportional to the template concentration, while the read-out of qPCR (signal vs. cycle) is proportional to the log of the template concentration. Thus, for dPCR, it is desirable to minimize sample volumes.

However, continuing to decrease reaction volumes may lead to challenges related to confidence in loading the array with sample volumes and maintaining the physical isolation of the sample volumes, for example. In other words, it is important to load the sample volume into as many wells or through-holes as possible and to reduce the cross-talk between the wells or through-holes.

SUMMARY

In one exemplary embodiment, an apparatus for biological reactions is provided. The apparatus includes a substrate and a plurality of reaction sites within the substrate. A surface of the substrate is configured to have a first hydrophilicity and each surface of the plurality of reaction sites is configured to have a second hydrophilicity to load a substantial number of reaction sites with a sample volume. The sample volume of each loaded reaction site is substantially confined to its respective reaction site. The sample volume is configured to undergo a biological reaction within the reaction site.

DETAILED DESCRIPTION

To provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Performing several biological reactions simultaneously may require a substrate with a plurality of reaction sites, each with a loaded sample. It should be recognized that reaction sites may be, but are not limited to, through-holes, indentations, or wells, for example. Further, to increase the number of reactions per experiment, the density of reaction sites on the substrate may be increased while also reducing the sample area size. For example, on a 15 mm×15 mm substrate, 10,000 reaction sites may be included. However, if 30,000 reaction sites are included in the 15 mm×15 mm substrate, the sample area may be smaller as well as increasing the density of reaction sites on the substrate.

According to various embodiments described herein, an apparatus that may be sufficiently loaded with a sample volume is provided. Surface characteristics such as the hydrophobicity and/or hydrophilicity of specific areas of the substrate may facilitate loading of liquid samples into the reaction sites. The level of hydrophobicity/hydrophilicity may be based on various factors that influence the ease and the efficiency of loading a plurality of reaction sites in a substrate as described above.

For example, one factor that affects loading of reactions sites is the physical geometry of the reaction sites and/or substrate may facilitate loading the sample. For example, the aspect ratio between reaction sites, based on reaction site depth (chip thickness) and diameter of the reaction sites, may be a factor in determining the characteristics needed for sufficient loading of the reaction sites. The ratio of reaction site depth (chip thickness) to diameter is referred to as aspect ratio. For example, the aspect ratio is 1 if the reaction site depth is equal to the reaction site diameter. In another example, the aspect ratio of 10 when reaction site depth is 10× larger than reaction site diameter. The diameter of the reaction site affects the capillary forces, which enable/facilitate reaction sites loading with the liquid reaction media. In some embodiments, the smaller the diameter, the larger capillary force and better/easier loading of the reaction sites.

Another factor that affects the loading of reaction sites with a sample volume according to various embodiments is the desired loading efficiency and/or consistency. Desired efficiency is more than or equal to 90% of the reaction sites loaded. In other embodiments, desire efficiency may be 90% of the reaction sites loaded and a reaction site-to-reaction site variation of at most 10%.

Another factor that affects the loading of reaction sites with a sample volume according to various embodiments is the compatibility of materials with a desired reaction within the reaction sites. In some embodiments, the desired reaction may be an amplification reaction. More specifically, the amplification reaction may be a polymerase chain reaction (PCR). The portion of an apparatus, according to various embodiments, which contacts the sample volume, enzymes, or reagents, for example, involved in the reaction should not chemically interact with the sample volume, enzyme, or reagents. For example, materials that are in contact with the reaction should not leach ions into to the reaction site which may interfere with the reaction.

Yet another factor that affects the loading of reaction sites according to various embodiments is the desired confinement of the sample volume once it is loaded into the reaction site. In other words, sufficient forces to prevent leakage of the sample volume from each reaction site, to prevent spilling over from one reaction site to another, and to prevent any pooling of sample volume outside the reaction sites is desired.

Taking into account the above-mentioned factors, an apparatus that can meet these goals may be designed and used to perform reactions in a plurality of reaction sites including small volumes.

To create the sufficient hydrophobic/hydrophilic characteristics of a surface, the surfaces may be coated with another material. According to various embodiments of the present teachings, a coating for a portion of a substrate surface that has hydrophilic characteristics and a coating for a portion of a surface of a reaction site that has hydrophilic characteristics. Although both surfaces have hydrophilic characteristics, the reaction sites may be loaded by capillary action, for example. According to various embodiments, the hydrophilic coating may be the same coating. According to various embodiments, the coating may be applied by vapor deposition.

On the other hand, according to various embodiments of the present teachings, a coating for a portion of a substrate surface that has hydrophobic characteristics and a coating for a portion of a surface of a reaction site that has hydrophobic characteristics. Although both surfaces have hydrophobic characteristics, the reaction sites may be loaded by capillary action, for example. According to various embodiments, the hydrophobic coating may be the same coating. According to various embodiments, the coating may be applied by vapor deposition.

Further, according to other embodiments described herein, a coating method for a substrate that includes coating a portion of a substrate surface to have a hydrophobic characteristic and a portion of the surface of the substrate to have a hydrophilic characteristic may facilitate. Further, according to some embodiments, the surfaces of the sample area are coated to be hydrophilic and the other surfaces of the substrate are coated to be hydrophobic. In this way, the hydrophobicity/hydrophilicity facilitate loading of liquid samples into the reaction sites. The reaction sites may be loaded by capillary action, for example.

Furthermore, according to various embodiments, having hydrophobic/hydrophilic surfaces may reduce cross contamination of liquid samples between reaction sites. The hydrophobic areas may help keep each liquid sample in its respective sample area within a reaction site. According to various embodiments, a continuous or complete coating may also prevent or reduce leaching of ions from the substrate that may interfere with the reactions.

A coating, according to various embodiments, has increased physical and chemical stability than other coatings, and is biocompatible. This may prevent or reduce adsorption and subsequent inhibition of the active biochemicals and materials used in biological reactions. These may include enzymes, probes, and DNA, for example. Especially for digital PCR applications, it is important that reaction chemicals and components adsorption to undesired surfaces is minimized.

Substrate

According to various embodiments described herein, substrate materials may be silicon, silicon oxide, glass, metals, ceramic, or plastic, for example. The glass may be photosensitive glass. However, one skilled in the art would recognize that any material that is biocompatible and does not interfere with fluorescence detection may be coated according to various embodiments of the present teachings.

As mentioned above, reduction in reaction volumes may allow for a higher density of reaction volumes so that more reactions can be performed within a given area. For example, an array comprised of 300 μm diameter through-holes in a substrate may contain about 30 nL of reaction volume. By reducing the size of each through-hole in an array to 60-70 μm in diameter, for example, each reaction volume may be 100 μL. According to various embodiments described herein, reaction volumes may range from about 1 μL to 30 nL. In some embodiments, an array of reaction sites may be comprised of a variety of different volume reaction areas so that dynamic range is increased.

Figure 1:
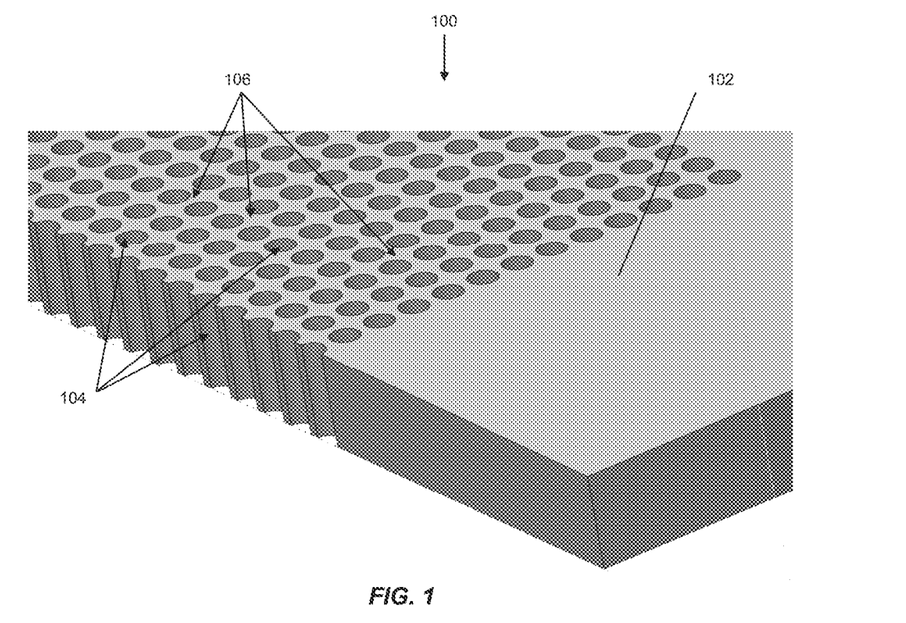
FIG. 1 is an exemplary coated substrate according to various embodiments of the present teachings.

FIG. 1 illustrates chip 100 including a substrate 100 with an array of reaction sites 104 according to various embodiments described herein. Chip 100 may be referred to as an article, device, consumable, array, slide or platen, for example.

Chip 100 comprises a substrate 100. Substrate 102 may be various materials including, but not limited to, metal, glass, ceramic, silicon and silicon oxide, for example.

Chip 100 further includes a plurality of reaction sites 104. The plurality of reaction sites 104 may be wells, cavities, or through-holes, for example. Each sample area may also have a variety of cross-sectional geometries, such as round, triangular, or hexagonal, for example. Having other geometries may allow for more closely packed reaction sites to further increase the number of reactions in a given area. Further, geometries of the reaction sites may also facilitate loading of liquid samples to the reaction sites.

The cross-sectional view of chip 100 in FIG. 1 illustrates a plurality of through holes 104. Each through-hole 104 extends from an opening in a first surface of substrate 102 to an opening in second surface of substrate 102, each through holes 104 being configured to provide sufficient surface tension by capillary action to hold respective liquid samples containing a biological sample to be processed or examined. Chip 100 may have a general form or construction as disclosed in any of U.S. Pat. Nos. 6,306,578; 7,332,271; 7,604,983; 7,6825,65; 6,387,331; or 6,893,877, which are herein incorporated by reference in their entirety as if fully set forth herein.

According to various embodiments, a through-hole 104 may have a volume of about 1.3 nanoliters. Alternatively, the volume of each through-hole may be less than 1.3 nanoliters, for example, by decreasing the diameter of through-holes 104 and/or the thickness of substrate 102. For example, each through-hole 104 may have a volume that is less than or equal to 1 nanoliter, less than or equal to 100 picoliters, less than or equal to 30 picoliters, or less than or equal to 10 picoliters. In other embodiments, the volume some or all of the through-hole 104 is in a range of 1 to 20 nanoliters.

In certain embodiments, a density of through-holes 104 may be at least 50 through-holes per square millimeter. In other embodiments, there may be higher densities of through-holes. For example, a density of through-holes 104 within chip 100 may be greater than or equal to 150 through-holes per square millimeter, greater than or equal to 200 through-holes per square millimeter, greater than or equal to 500 through-holes per square millimeter, greater than or equal to 1,000 through-holes per square millimeter, greater than or equal to 10,000 through-holes per square millimeter.

Other embodiments of chip 100 are further described in provisional applications 61/612,087, filed on Mar. 16, 2012, and 61/723,759, filed Nov. 7, 2012, which are incorporated herein for all purposes.

As mentioned above, reducing the size of a sample area may lead to challenges associated with loading the liquid sample into each sample area. A coating applied to the substrate surface according to various embodiments described herein may facilitate loading of liquid samples to reaction sites as well as minimize cross-talk between reaction sites.

Before coating, according to embodiments described herein, the substrates may be cleaned and hydrated to prepare them for the subsequent chemical reactions. Cleaning removes any possible contaminations that may have occurred during transport and storage, for example, to ensure consistency in the coating process.

It should be recognized that the methods and protocols described in this document are examples according to various embodiments described herein. The protocols may be modified to work on high aspect ratio chips and/or low aspect ratio chips. In some embodiments, sufficient loading may occur when the water contact angle is between 60-100 degrees. In other embodiments, sufficient loading may occur when the water contact angle is 75-90 degrees.

Further, both bi-coats and mono-coats may achieve coating as described by various embodiments. Moreover, coating methods according to various embodiments may include a liquid coating process as well as vapor deposition processes, for example.

Hydrophilicity Method

As mentioned above, according to various embodiments of the present teachings, a hydrophilic coating of the substrate surface as well as on the surface of the reaction sites may be used to facilitate preparation of an array of reaction sites for a biological reaction. Also mentioned above, a substrate may be referred to as a chip, and reaction sites may be, but are not limited to, through-holes, indentations, or wells, for example. According to various embodiments, the coating of the substrate surface and reaction sites may be the same material. In other embodiments, the coating of the substrate surface and the reaction sites may be different materials. The substrate surface and the surface of reaction sites may be coated by a vapor deposition process.

Even though both the substrate surface and the reaction site surface may have hydrophilic characteristics according to various embodiments, loading of the liquid sample may be based on capillary action. In other words, adhesion forces between the liquid sample and the walls of the reaction site will pull the liquid sample into the reaction sites. From the equation below, the amount of liquid sample that may be pulled into each reaction site depends on the radius of the reaction site.

The height h of a liquid column is given by:

$$h = \frac{2\gamma\cos\theta}{\rho g r}$$

where $\gamma$ is the liquid-air surface tension (force/unit length), $\theta$ is the water contact angle, $\rho$ is the density of liquid (mass/volume), g is local gravitational field strength (force/unit mass), and r is radius of reaction site (length).

According to various embodiments, the hydrophobic/hydrophilic characteristics of the substrate surface and the reaction sites may depend on the material the substrate and reaction sites are composed of and/or the material of the coating of those surfaces. The efficiency of loading of the reaction sites depends on the water contact angle of the liquid sample with the substrate surface and reaction site surfaces.

The spreading of the liquid sample from the sample loader depends on the water contact angle of the liquid sample. The water contact angle results from the relationship of the material properties of the sample loader with the properties of the liquid sample. When the water contact angle is less than 90 degrees, the relationship between the liquid sample and the substrate surface is hydrophilic and the sample exhibits a cohesive interaction with the substrate surface, which is necessary for capillary action to pull the sample into the through holes. A substrate that is too hydrophilic, for example, with a water contact angle below 50 degrees, may lead to increased pooling of excess liquid sample on the substrate surface, or inefficient loading of reaction sites, for example. Further, low contact angles may cause the liquid sample to move into some reaction sites too quickly resulting in an uneven distribution of liquid sample in the plurality of reaction sites.

Conversely when the water contact angle is over 90 degrees, the relationship between the substrate surface and the liquid sample is hydrophobic and the liquid sample will not move into the reaction sites, because the capillary force will be negative. This situation may also lead to pooling of liquid sample on the substrate surface and prevent loading of some reaction sites with liquid sample. As such, surfaces of the substrate and the reaction sites are designed to balance the hydrophobicity and hydrophilicity of the substrate and reaction sites surfaces with respect to the liquid sample.

Figure 2:
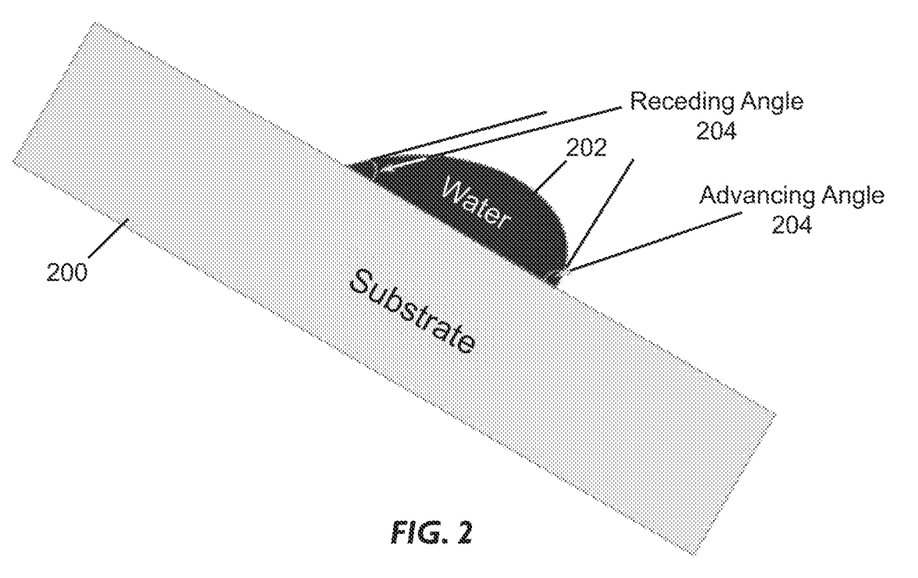
FIG. 2 illustrates a receding and advancing contact angles according to various embodiments of the present teachings.

With these characteristics in mind, according to various embodiments, efficient loading may be achieved by configuring the sample loader so that the advancing contact angle with the liquid sample is similar to the receding contact angle with the liquid sample. With reference to FIG. 2, advancing and receding contact angles are illustrated. A water droplet 202 is shown on a substrate 200. If the substrate is tilted, water droplet 202 will have an advancing contact angle 206 and a receding contact angle 204.

According to various embodiments described herein, an advancing contact angle of 70-85 degrees may provide sufficient loading of the liquid samples to the reaction sites.

The difference between the advancing and receding contact angles is known as the hysteresis. In various embodiments, the surface characteristics may be designed so that there is a hysteresis of zero degrees. In other embodiments, the surface characteristics may be designed so that there is a hysteresis of less than or equal to 30 degrees. In other embodiments, the surface characteristics may be designed so that there is a hysteresis of less than or equal to 20 degrees. In other embodiments, the surface characteristics may be designed so that there is a hysteresis between 0-15 degrees. A chip with high hysteresis will exhibit variation in the loaded volume in the through-holes, and may be prone to sample pooling on exterior surfaces.

Figure 3:
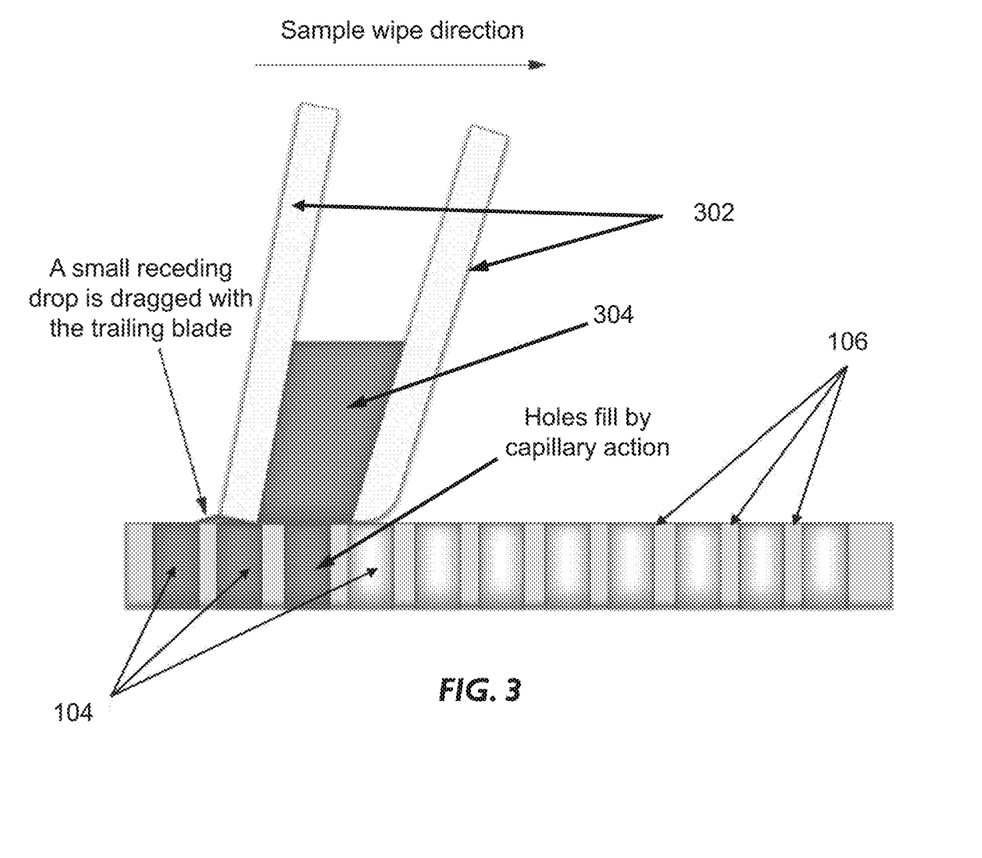
FIG. 3 illustrates loading of reaction sites by a sample loader according to various embodiments of the present teachings.

With reference to FIG. 3, loading of reaction sites by a sample loader is illustrated according to various embodiments described herein. The liquid sample 304 to be loaded into reaction sites 104 is within sample loader 302. Sample loader 302 is laterally moved across surface 106. As it is moved, liquid sample 304 is loaded into reaction sites 104 by capillary action.

As mentioned above, the coating according to various embodiments may be deposited by a vapor deposition process. An example of such a process is as follow:
1. Soak chips in 2-propanol for 30 seconds with sonication
2. Sonicate in 5:1:1 water:ammonium hydroxide:hydrogen peroxide v:v (from 30% stock solutions of hydrogen peroxide and ammonium hydroxide) at 60° C. for 10 minutes.
3. Sonicate in 4:1 water:nitric acid v:v (from 70% stock solution of nitric acid) at 60° C. for 10 minutes.
4. Dry
5. Vapor phase deposition of Hexamethyldisilazane (HMDS)

It should be recognized that other suitable coatings according to various embodiemtns described herein are alkyl-trimethoxysilanes, alkyl-triethoxysilanes, alkyl-dimethoxymonomethylsilanes, alkyl-diethoxymonomethylsilanes, alkyl-monomethoxydimethylsilanes, or alkyl-monoethoxydimethylsilanes, or any other silane, siloxane, silazane or phosphonate that is volatile under vacuum at elevated temperatures.

It should also be recognized that coating materials that create a slightly hydrophobic substrate surface and the surface of the reaction site may also be used to load reaction sites according to various embodiments described herein. Advancing water contact angles and receding water contact angles of 90-100 degrees may also be sufficient to load reaction sites according to various embodiments.

Hydrophilic/Hydrophobic Method

Figure 4:
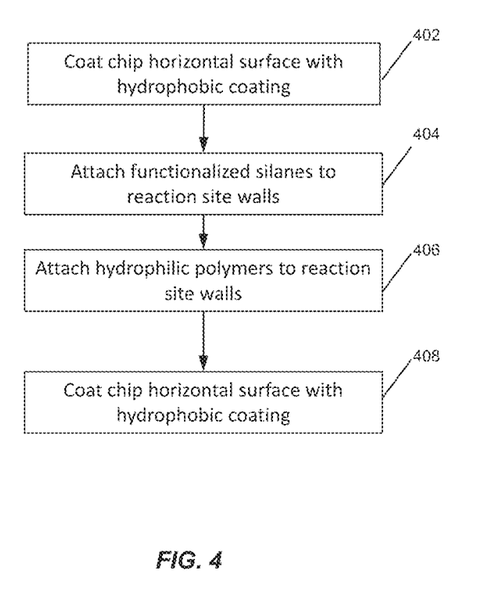
FIG. 4 is a flowchart illustrating an exemplary method according to various embodiments of the present teachings.

According to various embodiments described herein, below is an example of a coating process for achieving the desired characteristics for sufficient loading. The exemplary method is shown in FIG. 4.

Substrate Surface of Chip First Step: Hydrophobic Silanes (C1)

Figure 5:
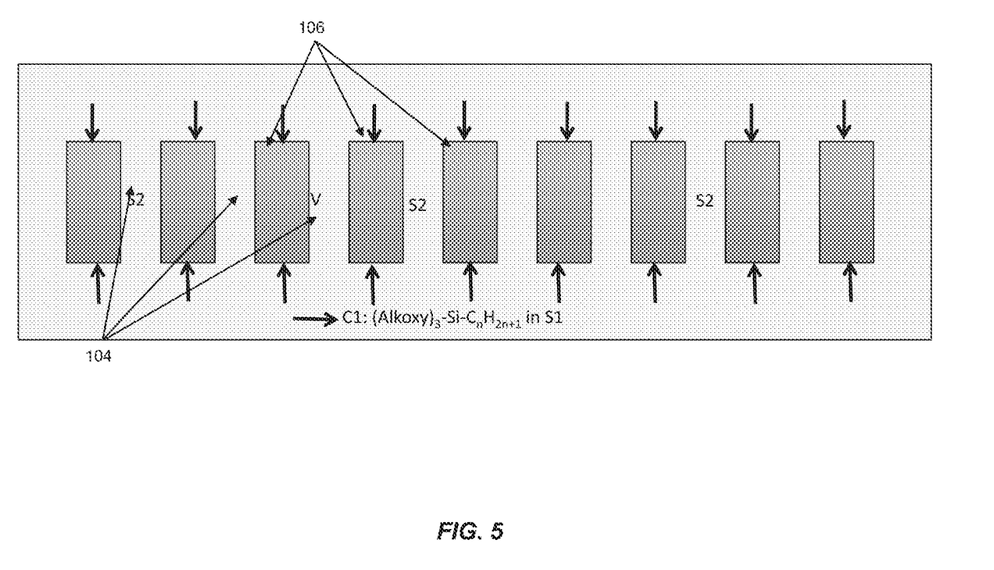
FIG. 5 illustrates a step in coating a substrate surface of a substrate according to various embodiments of the present teachings.

The method includes step 402 of creating a hydrophobic layer on substrate surface 106 (FIG. 1). With reference to FIG. 5, step 402 is illustrated where a hydrocarbon layer is added to substrate surface 106 by reacting the hydrated substrate surface with reactive tri-alkoxy silanes. One can fine tune 106 surface properties by choosing the proper hydrocarbon chain as the fourth functional group of the reacting tri-alkoxy silane.

Surface properties of substrate surface 106 are critical for consistent sample loading into reaction sites 104 and also to prevent sample pooling/remaining on substrate surface 106 after loading in reaction sites 104. Pooling of sample may lead to cross talk between adjacent reaction sites during the bio-reaction cycles and also may lead to subsequent false positive results. According to various embodiments, surface properties may be fine tuned with the length of hydrocarbon chain, the fourth functional group of silanes, to change surface properties, for example.

In one embodiment, illustrated in FIG. 5, 106, the substrate surfaces of the substrate are exposed and reacted with tri-alkoxy silane (the hydrocarbon chain can be from C4 to C20) dissolved in non-polar solvent, such as heptanes. Then, prior to immersing the substrates in silane solution, the reaction sites are filled with dilute acid solution in water which will protect the respective surfaces from reacting with the silanes dissolved in heptanes which are immiscible with water. The reaction between the alkoxy-silane and the hydrated surfaces continue to occur for given period of time. These reactions are completed by hydrolysis in acidic solutions and air. After reaction completion, the water is removed via washing with various solvents such as aceto nitrile, isopropyl alcohol and heptanes and the surfaces are prepared for the next step in the method, according to various embodiments.

Reaction Site Surfaces First Step: Functionalized Silanes (C2)

After rendering the substrate surface hydrophobic as in FIG. 5 (step 402 of FIG. 4), step 404 includes a process of coating the vertical surfaces of the reaction sites to be hydrophilic with a substantially continuous film. In this way, the sample volumes including bio-chemicals may be more easily loaded into each desired reaction site.

In this example, S1 respresents solvent 1 (hydrophobic) and S2 represents solvent 2 (hydrophilic). Here, S1 and S2 are immiscible solvents with S1 not having access to the area wetted by S2. C1 represents alkoxy silanes dissolved in S1. C1 may react with —OH groups present on the substrate surface 106. The reaction illustrated in FIG. 5 renders substrate surface 106 hydrophobic. The presence of S2 prevents S1 and the alkoxy silane from accessing the vertical surfaces of the reaction sites 104, maintaining the hydrophilicity.

Sample loading and retention in reaction sites during reactions may be controlled and enhanced by the aspect ratio and type of coating applied to the chip surfaces. Furthermore, some chip substrates may leach ions or have physical interaction with samples (bio)-chemicals, a substantially continuous coating may be needed. A substantially continuous coat is a coating that does not allow ions to leach into the reagent media.

In one example, a substantially continuous coating may be achieved with double functionalized silanes (alkoxy and epoxy groups), with the alkoxy group binding to the hydrated substrate, while the epoxy group mayenable the subsequent reactions with hydrophilic polymers.

Figure 6:
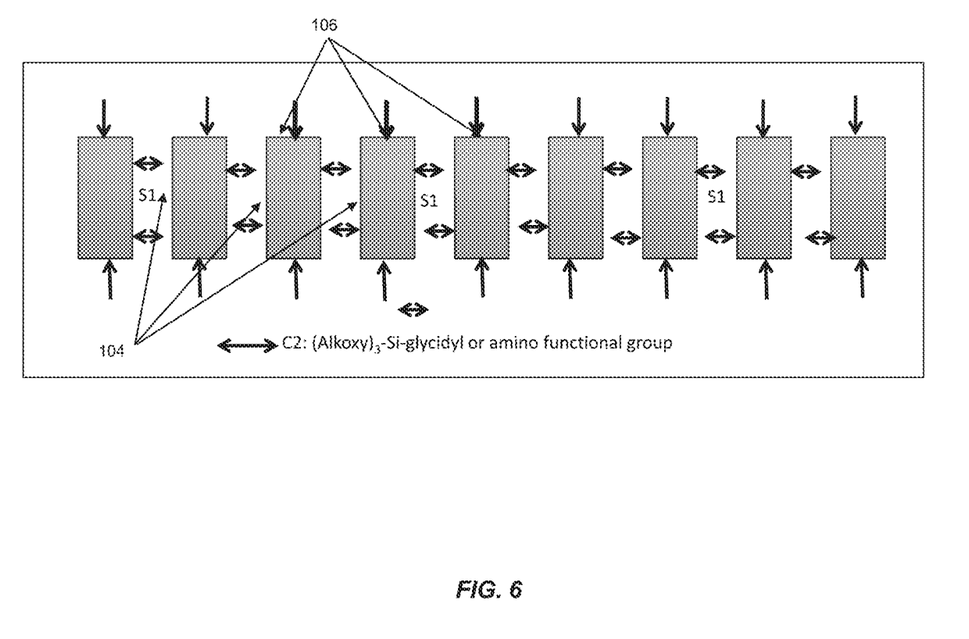
FIG. 6 illustrates a step in coating a vertical surface of a substrate according to various embodiments of the present teachings.

One embodiments of this step is illustrated in FIG. 6. As completed in FIG. 5, the substrate surface of the substrate has been covered with C4-C20 functionalized silane. The (Alkoxy)3-Si-glycidyl or amino functionalized silane might also react with unreacted —OH groups on the substrate surface 106.

More specifically, in the example illustrated in FIG. 6, C2 represents (Alkoxy)$_3$ glycidyl of amino functionalized silanes, which are dissolved in S1 and may react with —OH groups present on the surfaces of the reaction sites 104. In other words, the reaction site hydrated walls may react with a solution of tri-alkoxy silane functionalized with glycidyl group dissolved in heptanes.

The reaction of the reaction sites 104 renders some hydrophilicity to the surfaces of the reaction sites 104 and provides the functional groups for the next steps of the process to cover the horizontal walls with a protective, continuous layer. In other words, the glycidyl group may attach to the reaction site walls via the silane linked to the hydrated surface and may allow further chemistry to fine-tune the coating of the reaction sites to enable applications, such as dPCR, for example.

Reaction Site Surfaces Second Step: Attachment of Functionalized Polymers (C3)

Figure 7:
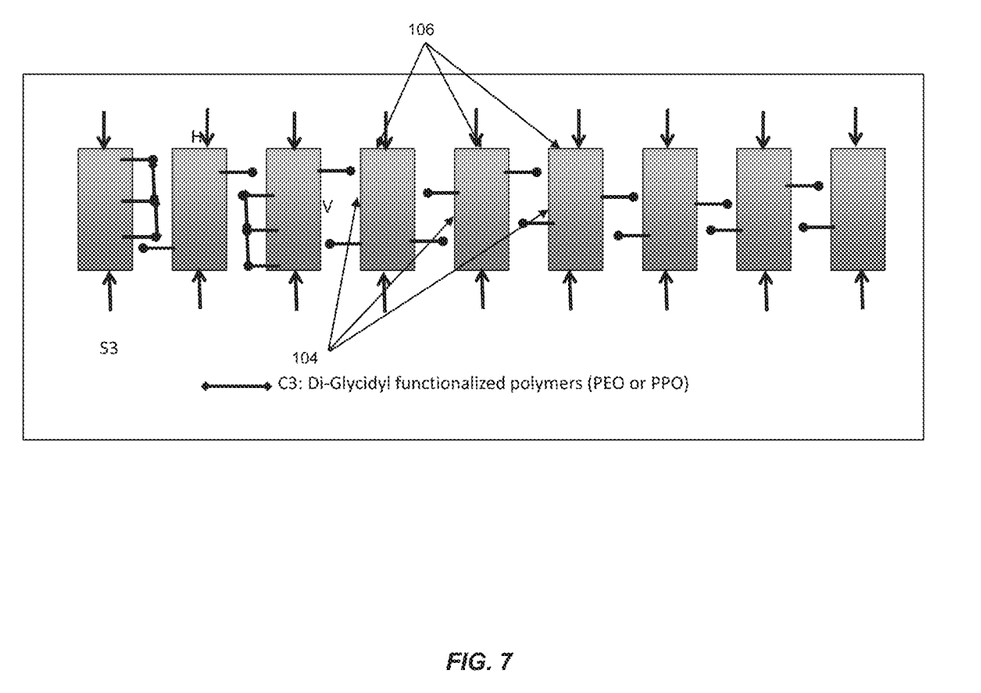
FIG. 7 illustrates another step in coating the substrate surface of a substrate according to various embodiments of the present teachings.

After step 404, step 406 is performed to create a hydrophilic coating of the reaction sites surfaces by attachment of hydrophilic polymers as illustrated in FIG. 7.

Coating step 406 is important when a chip is used with an aspect ratio close to 1, substrates which may leach ions or have other interactions with the bio-sample/reaction which could lead to inhibition, poisoning of the sample and erroneous or inaccurate results. As mentioned above, according to various embodiments, the goal of coating the chip is to achieve a substantially continuous, hydrophobic film covering substrate surface 106, which will allow for better sample loading and retention during reactions and non-interference in the reaction. The reactions may be during thermal cycling in some embodiments. In some embodiments, next, the glycidyl group made available in the previous step may be reacted with polyethylene glycols, polyvinyl alcohols or polypropylene glycols of various molecular weights with or without post reaction cross linking.

One embodiment is illustrated in FIG. 7. After the glycidyl group to the reaction site surfaces in FIG. 6, the glycidyl group is further modified. According to various embodiments, there may be two possible paths.

In the first possible path, the glycidyl group is reacted with polyethylene glycols of various molecular weights in presence of bases as catalyst. Di-glycidyl functionalized polyethylene and/or polypropylene oxides (PEO or PPO) of various molecular weights, represented as C3, are dissolved in a solvent S3. Thus, the glycidyl ring opens and reacts with the polyethylene glycol —OH. Next, an addition and reaction with di-glycidyl functionalized polyethylene and/or polypropylene glycols and subsequent cross linking in presence of polyamines generates a continuous film with tunable hydrophilicity.

In a second possible path, the glycidyl group is hydrolyzed. Then, the —OH with di-glycidyl functionalized polyethylene and/or polypropylene glycols are reacted. This is followed by subsequent cross linking in presence of polyamines. The reactions are completed via curing in air and oven for given lengths of time and temperatures (room T to 120 C), in one embodiment.

Substrate Surface Second Step: Hydrophobic Silanes (C1))

As mentioned above, step 402 of FIG. 4 covers substrate surface 106 with a hydrophobic layer. However, there is a possibility that there might be uncoated/unreacted parts of surface which may then react during the subsequent coating steps 404 and 406 of FIG. 4. This may lead to variation in hydrophobicity of the coating of substrate surfaces 106, which in turn could lead to sample pooling on substrate surface 106 while loading. This may lead to sample volumes bridging between reaction sites and erroneous results. To remedy this, the hydrophobic coating of the substrate surfaces may be repeated (step 402) using tri-alkoxy silanes functionalized with C4-C20 hydrocarbons to fine tune and homogenize the hydrophobicity coating of substrate surface 106, in some embodiments.

Next in step 408, the hydrophobic character substrate surfaces of the substrate may be fine-tuned. During the previous steps of coating the walls of reaction sites 104, there may have been some undesired reactions with the coating on the substrate surface. As such, in this step, the hydrophobic coating on the substrate surface may be adjusted.

Figure 8:
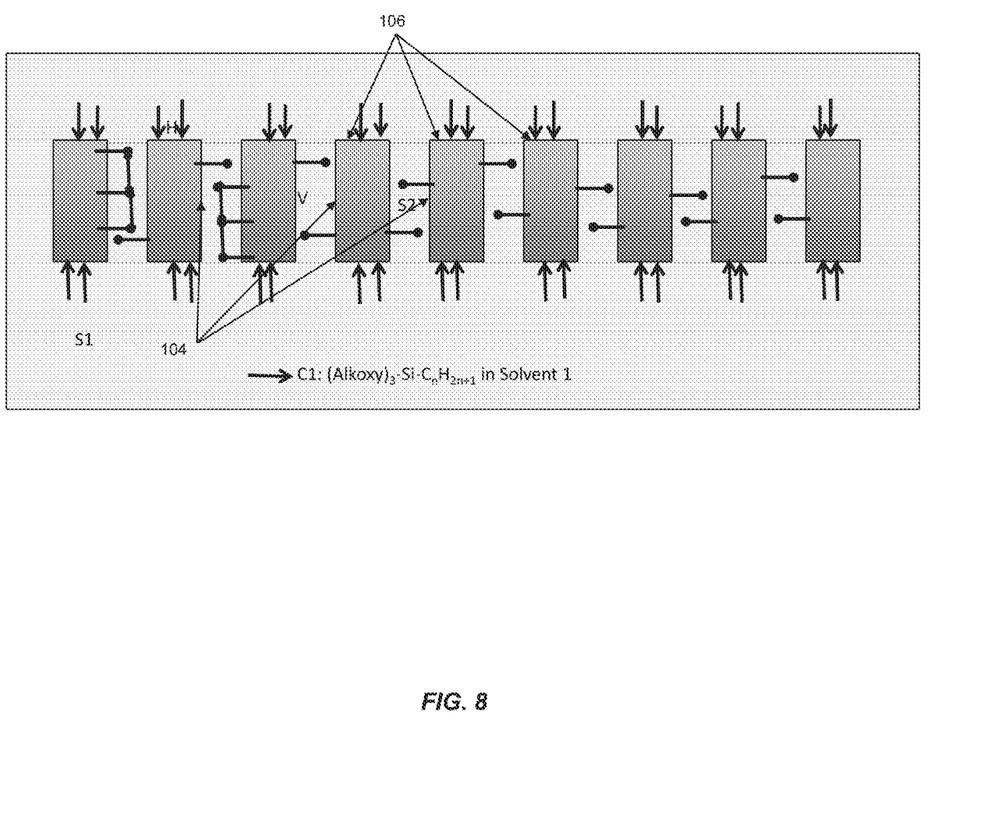
FIG. 8 illustrates another step in coating a vertical surface of a substrate according to various embodiments of the present teachings.

With reference to FIG. 8, S1 represents solvent 1 (hydrophobic) and S2 represents solvent 2 (hydrophilic). S1 and S2 are immiscible solvents with S1 not having access to the area wetted by S2. During step 404, with reference to FIG. 6, some C2 may have been attached to substrate surface 106 reducing the needed/necessary hydrophobicity. In some embodiments, an additional step like step 402 may be implemented again to fine tune the hydrophobicity of the substrate surface 106. This may be needed to achieve accurate dPCR. The presence of S2 within reaction sites 104 prevent S1 and the alkoxy silane from accessing to the surfaces of reaction sites 104, maintaining the hydrophilicity.

Step 408 may help to achieve the right balance between the substrate surface hydrophobicity and vertical surface hydrophilicity, and also balance with the physical geometric consideration of the substrate, such as reaction site pitch and thickness of the substrate. This may be important in enabling uniform and consistent loading of the reactors with the bio-samples to be assessed/investigated.

The following is a list of chemicals that may be used to implement embodiments of the present disclosure:

- Type one: silicon derivatives which will allow chemical bonds to any substrates having "hydrated" SiO2 and subsequently to the type two chemicals
- Type two: various (molecular weight and composition) epoxy polymers to enable cross linking of/with type one chemicals
- Butyl, hexyl, octyl, decyl, do-decyl, hexadecyl trimethoxy silane; same C4-C16 hydrocarbons triethoxysilane; per-fluorinated derivatives of same Cx
- Aminopropyl trimethoxy and/or triethoxy silane; other amino Cx trimethoxy and/or triethoxy silanes
- Glycidylpropyl dimethoxy methylsilane; glycidylpropyl trimethoxy and/or triethoxysilane; other glycidyl Cx trimethoxy and/or triethoxy silanes
- Sodium hydroxide solutions, hydrochloric acid solutions, sodium hypochlorite solutions Hydrophobic and hydrophilic solvents (pentanes, hexanes, heptanes, acetonitrile, isopropyl alcohol, ethanol, methanol, water, ketones, etc)

Diglycidyl monomers and/or polymers (polyethylene oxide (any molecular weight) functionalized diglycidyl, polypropylene oxide (any molecular weight) functionalized diglycidyl, polyvinyl alcohol functionalized diglycidyl, small molecular weight Cx hydrocarbons functionalized diglycidyl, diisocyanates compounds Amines, poly-amines, alcohols, poly-alcohols to be used as catalysts and cross linking agents As described above, the chip may be cleaned before coating the chip according to various embodiments described herein. Various cleaning protocols may be implemented. For example, an exemplary cleaning protocol is as follows:

1. 1×2 min rinse in IPA; 1×220 kHz; 1×170 kHz
2. 1×2 min rinse in ACN; 1×220 kHz; 1×170 kHz
3. 4×1 min rinse in DIW; 2×220 kHz; 2×170 kHz
4. 30 min in 15% HNO3, 15 min sonic at 220 kHz and 15 min sonic at 170 kHz
5. 1×2 min in 0.14% nitric acid with 1× sonic at 170 kHz and 1× at 220 kHz It should be recognized that coating step 402 may be implemented by a variety of protocols.

As an example, the following cleaning protocol, according to embodiments of the present disclosure, is given:

1. 45 min in 1.5% ndecyl trimethoxysilane (C10-silane) in heptanes (substrate surface; vertical surface blocked)
2. 15 min in 0.14% nitric acid
3. 30 min at RT in air
4. 2×2 min in IPA with sonic at 220 kHz 100% power
5. 2×2 min in heptanes with sonic at 220 kHz 100% power
6. 30 min in 2% 3 glycidyloxypropyl trimethoxysilane in heptanes (all surfaces); 5 min sonic 220 kHz at start
7. 2×1 min in ACN with sonic at 220 kHz It should be recognized that coating step 404 and 406 may be implemented by a variety of protocols. However, as an example, the following protocol, according to embodiments of the present disclosure, is given:

1. 90 min in 2% PEG 8k and 0.1% TPA in ACN with 5 min sonic at 220 kHz, 100% power
2. 30 min in air at RT
3. 90 min in oven at 92 C
4. 1×2 min in DIW, sonic at 170 kHz, 100% power
5. 1×2 min in IPA, sonic at 170 kHz, 100% power
6. 1×2 min in heptanes, sonic at 170
7. 1×2 min in IPA, sonic at 170 kHz, 100% power
8. 1×2 min in aceto nitrile (ACN); sonic at 170 kHz, 100% power
9. 2×1 min DIW sonic at 220 kHz
10. 2×1 min DIW sonic at 170 kHz
11. 15 min in air
12. Blow dry with air
13. 30 min in oven at 92 C
14. React 30 min in 2% 3 glycidyloxypropyl trimethoxylsilane in heptanes; 5 min sonic 220 kHz at start
15. 2×1 min in ACN with sonic 1× at 220 kHz and 170 kHz
16. React 90 min in 2% Jeff Amine 5k and 0.1% TPA in ACN with 5 min sonic at 220 kHz, 100% power
17. Dry for 15 min in air at RT
18. React/dry for 90 min in oven at 92 C
19. 1×2 min in IPA, sonic at 170 kHz
20. 1×2 min in heptane, sonic at 170 kHz
21. 1×2 min in IPA, sonic at 170 kHz
22. 1×2 min in aceto nitrile (ACN); sonic at 170 kHz, 100% power
23. 2×1 min rinse DIW with sonic 170 kHz
24. 1×2 min in 0.5% bleach (5 ml Clorox+95 ml DIW); sonic at 170 kHz
25. 4×1 min DIW 2× sonic at 170 kHz and 2× sonic at 220 kHz
26. 15 min in air
27. Blow dry with air
28. 30 min dry in oven at 92 C
29. Vacuum pack Another example of a protocol to implement the coating according to embodiments described herein is described below. The following method may work on high aspect ratio chips as well as low aspect ratio chips. For high aspect ratio chips, capillary forces is a more prominent factor in the loading process.

1. Cleaning; Mikroglas arrays;
2. 2×2 min rinse in IPA; 1×220 kHz; 1×170 kHz
3. 2×2 min rinse in ACN; 1×220 kHz; 1×170 kHz
4. 4×2 min rinse in DIW; 2×220 kHz; 2×170 kHz
5. 30 min in 15% HNO3, 15 min sonic at 220 kHz and 15 min sonic at 170 kHz
6. 1×2 min in 0.14% nitric acid with 1× sonic at 170 kHz and 1× at 220 kHz
7. 4×1 min in DIW with sonic at 2×170 kHz and 2×220 kHz
8. 2×2 min in IPA with sonic at 220 kHz 100% power
9. 2×2 min in heptanes with sonic 1× at 220 kHz and 1× at 170 kHz A coating method according to various embodiments described herein may also meet processing requirement desires. For example, if a substrate used for biological reactions is one that is used by a high volume of customers, the coating method according to various embodiments is reproducible, can meet cost requirements, and scalable to meet demands for the use of the substrate.

Figure 9:
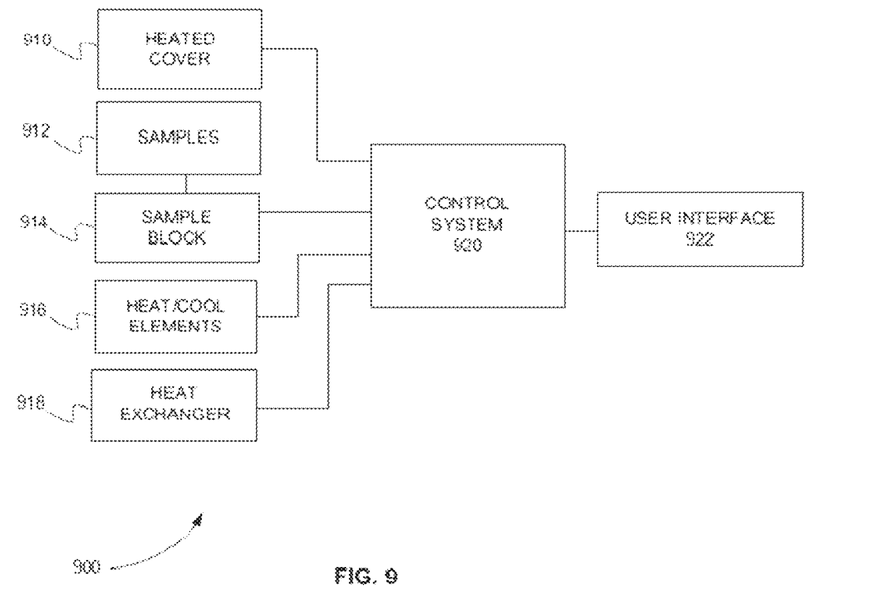
FIG. 9 illustrates a block diagram of an exemplary polymerase chain reaction instrument that may use substrates coated according to various embodiments of the present teachings.

As mentioned above, an instrument that may be utilized according to various embodiments, but is not limited to, is a polymerase chain reaction (PCR) instrument. FIG. 9 is a block diagram that illustrates a PCR instrument 900, upon which embodiments of the present teachings may be implemented. PCR instrument 900 may include a heated cover 910 that is placed over a plurality of samples 912 contained in a sample support device (not shown). In various embodiments, a sample support device may be a glass or plastic slide with a plurality of sample regions, which sample regions have a cover between the sample regions and heated cover 910. Some examples of a sample support device may include, but are not limited to, a multi-well plate, such as a standard microtiter 96-well, a 384-well plate, a chip illustrated in FIG. 1, or a microcard, or a substantially planar support, such as a glass or plastic slide. The sample regions in various embodiments of a sample support device may include depressions, indentations, ridges, and combinations thereof, patterned in regular or irregular arrays formed on the surface of the substrate. Various embodiments of PCR instruments include a sample block 914, elements for heating and cooling 916, a heat exchanger 918, control system 920, and user interface 922. Various embodiments of a thermal block assembly according to the present teachings comprise components 914-918 of PCR instrument 900 of FIG. 9.

For embodiments of PCR instrument 900 in FIG. 9, control system 920, may be used to control the functions of the detection system, heated cover, and thermal block assembly. Control system 920 may be accessible to an end user through user interface 922 of PCR instrument 900 in FIG. 9. Also a computer system 100, as depicted in FIG. 1, may serve as to provide the control the function of PCR instrument 900 in FIG. 9, as well as the user interface function. Additionally, computer system may provide data processing, display and report preparation functions. All such instrument control functions may be dedicated locally to the PCR instrument, or a computer system may provide remote control of part or all of the control, analysis, and reporting functions.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Exemplary systems for methods related to the various embodiments described in this document include those described in following U.S. provisional patent applications:
 U.S. Provisional application No. 61/612,087, filed on Mar. 16, 2012; and
 U.S. Provisional application No. 61/723,759, filed on Nov. 7, 2012; and
 U.S. Provisional application No. 61/612,005, filed on Mar. 16, 2012; and
 U.S. Provisional application No. 61/612,008, filed on Mar. 16, 2012; and
 U.S. Provisional application No. 61/723,658, filed on Nov. 7, 2012; and
 U.S. Provisional application No. 61/723,738, filed on Nov. 7, 2012; and
 U.S. Provisional application No. 61/659,029, filed on Jun. 13, 2012; and
 U.S. Provisional application No. 61/723,710, filed on Nov. 7, 2012; and
 U.S. Provisional application No. 61/774,499, filed on Mar. 7, 2013; and
 PCT International application no. PCT/US2013/032002, filed Mar. 15, 2013; and
 PCT International application no. PCT/US2013/032420, filed Mar. 15, 2013; and
 PCT International application no. PCT/US2013/032107, filed Mar. 15, 2013; and
 PCT International application no. PCT/US2013/032242, filed Mar. 15, 2013; and
 PCT International application no. PCT/US2013/031890, filed Mar. 15, 2013.

All of these applications are also incorporated herein in their entirety by reference.

Although various embodiments have been described with respect to certain exemplary embodiments, examples, and applications, it will be apparent to those skilled in the art that various modifications and changes may be made without departing from the present teachings.

What is claimed is:

1. An apparatus for biological reactions, the apparatus comprising:
 a substrate comprising a substrate surface;
 a plurality of reaction sites within the substrate, wherein each reaction site comprises a reaction site surface; and
 a coating material, wherein the coating material coats the substrate surface and each reaction site surface, the coated substrate surface has a water contact angle of 60-100 degrees, the coated substrate surface has an advancing contact angle of 70-85 degrees, and each of the coated reaction site surfaces is configured to load the reaction sites with a sample for undergoing a biological reaction.

2. The apparatus of claim 1, wherein the coating material configures the substrate surface and the each of the reaction site surfaces to have the same hydrophilicity.

3. The apparatus of claim 1, wherein the difference between the advancing water contact angle and the receding contact angle of the substrate surface is 0 to 30 degrees.

4. The apparatus of claim 1, wherein the coating material is hexamethyldisilazane (HMDS).

5. The apparatus of claim 1, wherein the substrate surface and each reaction site surface are coated by a vapor deposition process.

6. The apparatus of claim 1, wherein the sample volume loaded into the plurality of reaction sites is at most 1 nanoliter.

7. The apparatus of claim 1, wherein the substrate is composed of one material of the following: silicon, silicon oxide, glass, and plastic.

8. The apparatus of claim 1, wherein the plurality of reaction sites are through-holes.

9. The apparatus of claim 1, wherein the biological reaction is an amplification reaction.

10. The apparatus of claim 1, wherein the coating material results in a hydrophilicity to generate a sufficient surface tension force to substantially confine the sample within each loaded reaction site.

11. The apparatus of claim 1, wherein capillary action determines a volume of sample loaded into each reaction site, wherein the amount of capillary action is based on a dimension of each reaction site.

12. An instrument, comprising:
 a detection system;
 control system configured to control the functions of the detection system;
 a sample support device including substrate comprising a substrate surface and a plurality of reaction sites disposed along the substrate surface, each reaction site comprising a reaction site surface;
 a coating material, wherein:
  the coating material coats the substrate surface, to provide a coated substrate surface,
  the coating material coats each of the reaction site surfaces to provide a plurality of coated reaction sites,
  the coated substrate surface has a water contact angle of 60-100 degrees, and
  the coated substrate surface has an advancing contact angle of 70-85 degrees.

13. The instrument of claim 12, wherein
 each of the coated reaction site surfaces is configured to load the reaction sites with a sample; and
 each sample is configured to undergo a biological reaction within the reaction site.

14. The instrument of claim 12, wherein the instruments is a polymerase chain reaction instrument.

* * * * *